(12) United States Patent
Yokoyama et al.

(10) Patent No.: US 12,454,192 B2
(45) Date of Patent: Oct. 28, 2025

(54) ELEVATING OPERATION APPARATUS AND OPERATION METHOD

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 607 days.

(21) Appl. No.: 17/938,029

(22) Filed: Oct. 4, 2022

(65) Prior Publication Data

US 2023/0107122 A1    Apr. 6, 2023

(30) Foreign Application Priority Data

Oct. 5, 2021    (JP) ................. 2021-164250

(51) Int. Cl.
*B60L 53/62* (2019.01)
*B60L 53/12* (2019.01)
*B60L 53/66* (2019.01)
*B60L 58/12* (2019.01)

(52) U.S. Cl.
CPC ............. *B60L 53/62* (2019.02); *B60L 53/12* (2019.02); *B60L 53/66* (2019.02); *B60L 58/12* (2019.02)

(58) Field of Classification Search
CPC .......... B60L 53/62; B60L 53/12; B60L 53/66; B60L 58/12; B60L 53/35
See application file for complete search history.

(56) References Cited

U.S. PATENT DOCUMENTS

2017/0166072 A1 *   6/2017   Katanoda ................ B60L 53/38
2021/0197677 A1     7/2021   Terada

FOREIGN PATENT DOCUMENTS

CN    112204847 A  *  1/2021   ............ B60L 53/126
JP    2019170050 A    10/2019

* cited by examiner

*Primary Examiner* — David V Henze-Gongola
(74) *Attorney, Agent, or Firm* — HAUPTMAN HAM, LLP

(57) ABSTRACT

An elevating operation apparatus includes: an obtaining device configured to obtain a first information and a second information, wherein the first information indicates whether or not one vehicle, which has a power receiving unit for wireless electric power supply, includes an elevating mechanism for moving the power receiving unit in a height direction of the one vehicle, and the second information indicates whether or not a power supply apparatus, which is installed outside the one vehicle and which has a power transmitting unit for wireless electric power supply, includes an elevating mechanism for moving the power transmitting unit in the height direction; and a determining device configured to determine to move at least one of the power receiving unit and the power transmitting unit in the height direction on the basis of the first information and the second information.

20 Claims, 5 Drawing Sheets

DETERMINATION TABLE 1

|  | WITH POWER SUPPLY SIDE ELEVATING MECHANISM | WITHOUT POWER SUPPLY SIDE ELEVATING MECHANISM |
|---|---|---|
| WITH VEHICLE SIDE ELEVATING MECHANISM | DETERMINATION TABLE 2 | ACTIVATE VEHICLE SIDE ELEVATING MECHANISM |
| WITHOUT VEHICLE SIDE ELEVATING MECHANISM | ACTIVATE POWER SUPPLY SIDE ELEVATING MECHANISM | NO ELEVATING OPERATION |

FIG. 5A

DETERMINATION TABLE 2

| CONDITION | PROCESS |
|---|---|
| ANOTHER VEHICLE POSSIBLY CONTINUES TO USE | ACTIVATE VEHICLE SIDE ELEVATING MECHANISM |
| TYPE IS SAME AS / SIMILAR TO TYPE OF SUBSEQUENT ANOTHER VEHICLE | ACTIVATE POWER SUPPLY SIDE ELEVATING MECHANISM |
| THERE IS AN ABNORMALITY IN VEHICLE SIDE LIFTING MECHANISM | ACTIVATE POWER SUPPLY SIDE ELEVATING MECHANISM |
| THERE IS AN ABNORMALITY IN POWER SUPPLY SIDE LIFTING MECHANISM | ACTIVATE VEHICLE SIDE ELEVATING MECHANISM |
| BATTERY STATE IS LOW SOC | ACTIVATE POWER SUPPLY SIDE ELEVATING MECHANISM |
| ROAD SURFACE IS ROUGH | ACTIVATE POWER SUPPLY SIDE ELEVATING MECHANISM |
| RAINFALL / SNOWFALL IS DETECTED | ACTIVATE VEHICLE SIDE ELEVATING MECHANISM |
| GROUND HEIGHT > PREDETERMINED VALUE | ACTIVATE BOTH ELEVATING MECHANISMS |
| TIME REQUIRED UNTIL ARRIVING AT GROUND POWER SUPPLY APPARATUS IS LESS THAN PREDETERMINED TIME | ACTIVATE BOTH ELEVATING MECHANISMS |

FIG. 5B

ELEVATING OPERATION APPARATUS AND OPERATION METHOD

CROSS-REFERENCE TO RELATED APPLICATIONS

This application is based upon and claims the benefit of priority of the prior Japanese Patent Application No. 2021-164250, filed on Oct. 5, 2021, the entire contents of which are incorporated herein by reference.

BACKGROUND

1. Technical Field

Embodiments of the present disclosure relate to a elevating operation apparatus and an operation method that move up or down at least one of a power receiving unit and a power transmitting unit for wireless electric power supply.

2. Description of the Related Art

As this type of apparatus, for example, an apparatus which controls moving up and down a power receiving unit, which is provided on a floor of a vehicle and which can move up and down, when it is detected that an obstacle contacts with the power receiving unit, is proposed (see JP2019-170050A as Patent Literature 1).

There is a possibility that not only a power receiving apparatus (e.g., a vehicle), but also a power supply apparatus is provided with a elevating mechanism. When both the power receiving apparatus and the power supply apparatus are provided with elevating mechanisms, how to activate them would be an issue. This problem is not considered in the technique/technology described in Patent Document 1.

SUMMARY

In view of the problem described above, it is therefore an object of embodiments of the present disclosure to provide an elevating operation apparatus and an operation method that are configured to appropriately perform operation of an elevating mechanism.

The above object of embodiments of the present disclosure can be achieved by an elevating operation apparatus including: an obtaining device configured to obtain a first information and a second information, wherein the first information indicates whether or not one vehicle, which has a power receiving unit for wireless electric power supply, includes an elevating mechanism for moving the power receiving unit in a height direction of the one vehicle, and the second information indicates whether or not a power supply apparatus, which is installed outside the one vehicle and which includes a power transmitting unit for wireless electric power supply, includes an elevating mechanism for moving the power transmitting unit in the height direction; and a determining device configured to determine to move at least one of the power receiving unit and the power transmitting unit in the height direction on the basis of the first information and the second information.

The above object of embodiments of the present disclosure can be achieved by an operation method in an elevating operation apparatus, including: an obtaining step in which the elevating operation apparatus obtains a first information and a second information, wherein the first information indicates whether or not one vehicle, which has a power receiving unit for wireless electric power supply, includes an elevating mechanism for moving the power receiving unit in a height direction of the one vehicle, and the second information indicates whether or not a power supply apparatus, which is installed outside the one vehicle and which includes a power transmitting unit for wireless electric power supply, includes an elevating mechanism for moving the power transmitting unit in the height direction; and a determining step in which the elevating operation apparatus determines to move at least one of the power receiving unit and the power transmitting unit in the height direction on the basis of the first information and the second information.

BRIEF DESCRIPTION OF THE DRAWINGS

FIG. 5A is a diagram illustrating an example of a determination table associated with elevating mechanisms;

FIG. 5B is a diagram illustrating an example of a determination table associated with the elevating mechanism.

DETAILED DESCRIPTION OF THE EMBODIMENT

An elevating operation apparatus according to an embodiment will be described with reference to FIG. 1 to FIG. 6.

(Overall Configuration of Wireless Power Supply System)

Figure 1:
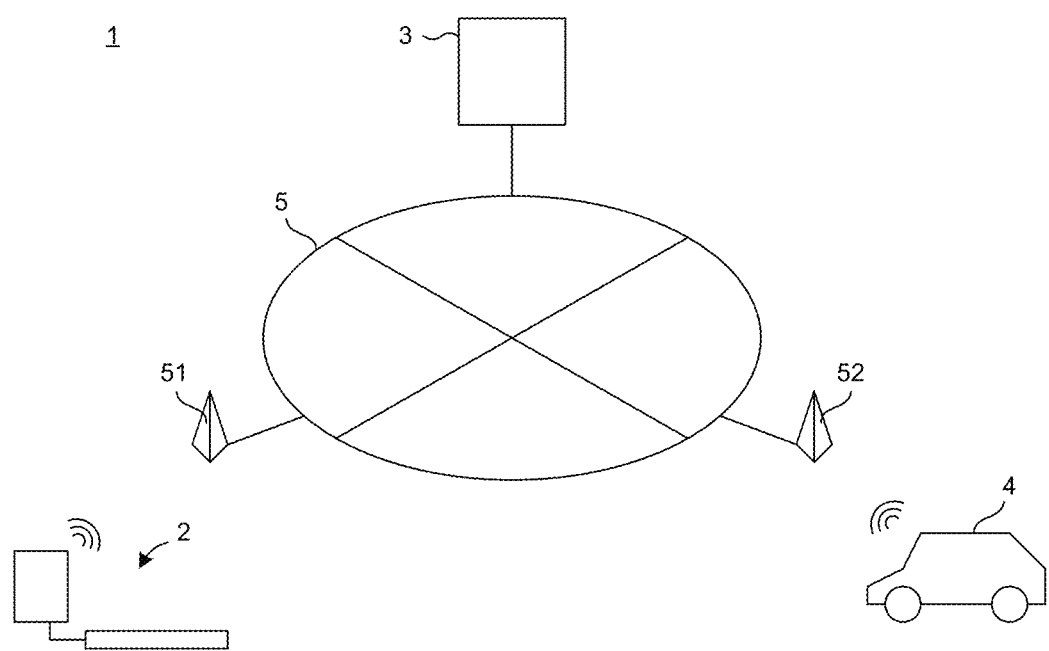
FIG. 1 is a diagram illustrating a configuration of a wireless power supply system according to an embodiment.

An overall configuration of a wireless power supply system will be described with reference to FIG. 1. In FIG. 1, a wireless power supply system 1 includes a ground power supply apparatus 2, a server 3, and a vehicle 4. In the wireless power supply system 1, electric power transmission is performed in a wireless manner from the ground power supply apparatus 2 to the vehicle 4. The wireless power supply system 1 may include a plurality of ground power supply apparatuses and a plurality of vehicles. In FIG. 1, however, only the ground power supply apparatus 2 and the vehicle 4 are illustrated not to make the figure complicated.

Incidentally, various methods such as, for example, magnetic field resonance coupling (magnetic field resonance) can be applied to the wireless power transmission. Furthermore, the wireless power transmission may be performed during the stop of the vehicle 4, or may be performed during the running of the vehicle 4.

The ground power supply apparatus 2, the server 3 and the vehicle 4 may be communicable with each other via a communication network 5 including, for example, an optical communication channel or the like. The ground power supply apparatus 2 may be connected to the network 5, for example, via a wireless base station 51, or may be connected to the network 5 via a not-illustrated communication cable. The vehicle 4 is connected to the network 5, for example, via a wireless base station 52.

When the ground power supply apparatus 2 and the vehicle 4 are relatively apart (e.g., 10 meters or more), the ground power supply apparatus 2 and the vehicle 4 make communication via the server 3. The communication between the ground power supply apparatus 2 and the vehicle 4 via the server 3 is hereinafter referred to as "wide area wireless communication" as appropriate. On the other hand, when the ground power supply apparatus 2 and the vehicle 4 are relatively close (e.g., less than 10 meters), the ground power supply apparatus 2 and the vehicle 4 make communication directly (in other words, without via the server 3). The communication between the ground power supply apparatus 2 and the vehicle 4 without via the server 3 is hereinafter referred to as "narrow area wireless communication" as appropriate.

In the wireless power supply system 1, in order to perform the wireless power transmission from the ground power supply apparatus 2 to the vehicle 4, the ground power supply apparatus 2 is required to identify the vehicle 4 which is a power supply target and to obtain information such as, for example, a required supply power of the vehicle 4. Therefore, it is necessary to transmit vehicle information including vehicle identification information from the vehicle 4 to the ground power supply apparatus 2.

The vehicle 4 transmits, for example, the vehicle information associated with the vehicle identification information, to the ground power supply apparatus 2 via the wide area wireless communication, when it is relatively away from the ground power supply apparatus 2. Furthermore, the vehicle 4 transmits, for example, the vehicle information associated with the vehicle identification information, to the ground power supply apparatus 2 via the narrow area wireless communication, when it is relatively close to the ground power supply apparatus 2.

(Configuration of Ground Power Supply Apparatus)

Figure 2:
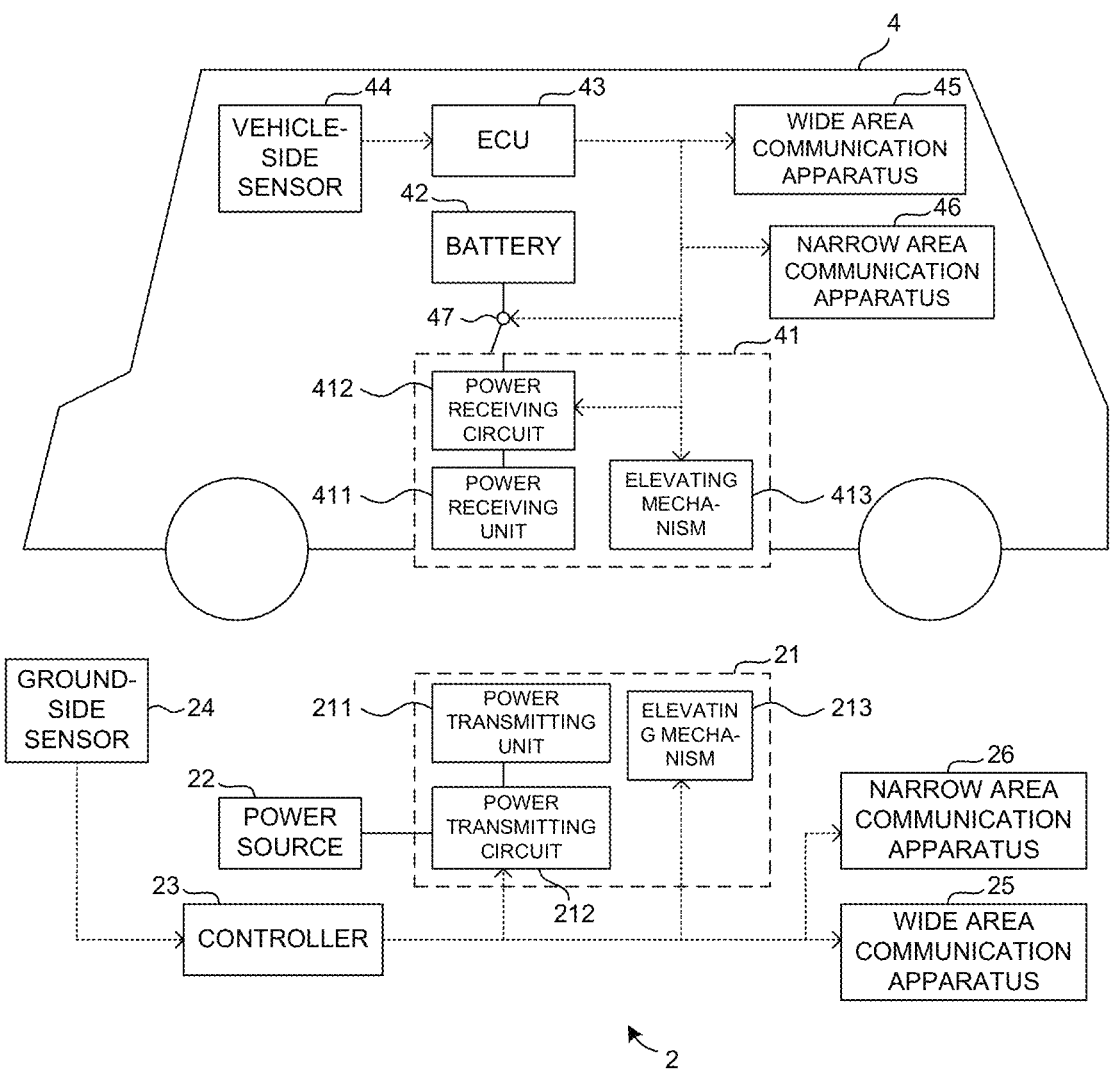
FIG. 2 is a diagram illustrating a configuration of a vehicle and a configuration of a ground power supply apparatus according to the embodiment.

A configuration of the ground power supply apparatus 2 will be described with reference to FIG. 2. In FIG. 2, the ground power supply apparatus 2 includes a power transmitting apparatus 21, a power source 22, a controller 23, a ground-side sensor 24, a wide area communication apparatus 25 and a narrow area communication apparatus 26. The power transmitting apparatus 21 includes a power transmitting unit 211, a power transmitting circuit 212 and a elevating mechanism 213. The elevating mechanism 213 is configured to move the power transmitting unit 211 in a direction perpendicular to the ground (in other words, in a height direction of the vehicle 4). The power source 22 is electrically connected to the power transmitting unit 211 via the power transmitting circuit 212.

Incidentally, the power transmitting unit 211 and the power transmitting circuit 212 are configured in accordance with a method of the wireless power transmission applied to the wireless power supply system 1. A detailed description of the elevating mechanism will be omitted because various existing aspects can be applied to the mechanism. The power source 22 may be an AC power source, or may be a DC power source.

The controller 23 performs various controls regarding the ground power supply apparatus 2. The controller 23, for example, controls the power transmitting circuit 212 when the electric power transmission to the vehicle 4 is performed, and controls the wide area communication apparatus 25 and the narrow area communication apparatus 26. Here, the wide area communication apparatus 25 is used for the wide area wireless communication, and the narrow area communication apparatus 26 is used for the narrow area wireless communication. The wide area communication apparatus 25 is configured in accordance with a communication method applied to the wide area wireless communication. Similarly, the narrow area communication apparatus 26 is configured in accordance with a communication method applied to the narrow area wireless communication.

The ground-side sensor 24 may include, for example, a current sensor for detecting electric current related to the power transmitting apparatus 21, a voltage sensor for detecting voltage related to the power transmitting apparatus 21, a temperature sensor for detecting temperature related to the power transmitting apparatus 21, a foreign object sensor for detecting a foreign object around the ground-side power supply apparatus 2, a biosensor for detecting a living body around the ground-side power supply apparatus 2, a rainfall sensor, and the like. The output of the ground-side sensor 24 is inputted to the controller 22.

(Configuration of Vehicle)

A configuration of the vehicle 4 will be described with reference to FIG. 2. In FIG. 2, the vehicle 4 includes a power receiving apparatus 41, a battery 42, an ECU (Electronic Control Unit) 43, a vehicle-side sensor 44, a wide area communication apparatus 45 and a narrow area communication apparatus 46. The power receiving apparatus 41 includes a power receiving unit 411, a power receiving circuit 412 and a elevating mechanism 413. The elevating mechanism 413 is configured to move the power receiving unit 411 in the direction perpendicular to the ground (in other words, in the height direction of the vehicle 4). The battery 42 is electrically connected to the power receiving unit 411 via the power receiving circuit 412 and a relay 47. In FIG. 2, among the components of the vehicle 4, a member that is not directly related to the wireless power transmission it is not illustrated.

The power receiving unit 411 is disposed, for example, on the bottom (in other words, the floor) of the vehicle 4. The power receiving apparatus 41 receives an electric power from the power transmitting apparatus 21 of the ground power supply apparatus 2. The electric power received from the power transmitting apparatus 21 is supplied to the battery 42 via the power receiving unit 411 and the power receiving circuit 412 of the power receiving apparatus 41 and the relay 47.

The ECU 43 performs various controls of the vehicle 4. The ECU 43 controls the power receiving circuit 412, for example when the electric power transmission is performed, or controls the wide area communication apparatus 45 and the narrow area communication apparatus 46. Here, the wide area communication apparatus 45 is used for the wide area wireless communication, and the narrow area communication apparatus 46 is used for the narrow area wireless communication. The ECU 43 controls the power receiving circuit 412 or the like via a not-illustrated in-vehicle network conforming to standards such as, for example, a CAN (Controller Area Network).

The wide area communication apparatus 45 is configured in accordance with the communication method applied to the wide area wireless communication. Similarly, the narrow area communication apparatus 46 is configured in accordance with the communication method applied to the narrow area wireless communication.

The vehicle-side sensor 44 may include, for example, a battery temperature sensor for detecting temperature of the battery 42, a battery current sensor for detecting a charge current value and a discharge current value of the battery 42, a current sensor for detecting electric current related to the power receiving apparatus 41, a voltage sensor for detecting voltage related to the power receiving apparatus 41, a temperature sensor for detecting temperature related to the power receiving apparatus 41, a rainfall sensor, and the like. The output of the vehicle-side sensor 44 is inputted to the ECU 43.

(Server Configuration)

Figure 3:
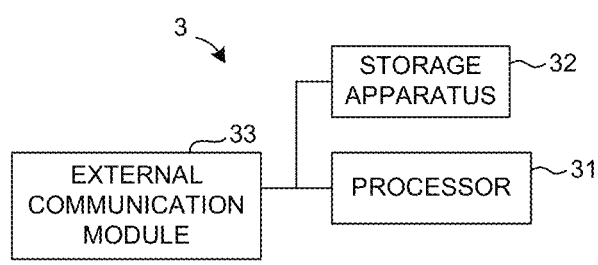
FIG. 3 is a diagram illustrating a configuration of a server according to the embodiment.

A configuration of the server 3 will be described with reference to FIG. 3. In FIG. 3, the server 3 includes a processor 31, a storage apparatus 32, and an external communication module 33. The external communication module 33 has a circuit for connecting the server 3 to the communication network 5. The external communication module 33 is configured to communicate with the ground power supply apparatus 2 and the vehicle 4 via the communication network 5.

(Flow of Wireless Power Transmission)

A description will be given to a schematic flow of the control when the wireless power transmission is performed from the ground power supply apparatus 2 to the vehicle 4 in the wireless power supply system 1 configured as described above.

First, the ECU 43 of the vehicle 4 controls the wide area communication apparatus 45 so as to transmit the vehicle information associated with the vehicle identification information to the server 3. Here, the vehicle information is information on the vehicle 4 regarding the electric power transmission. The vehicle information may include, for example, vehicle required power indicating an electric power required for the ground power supply apparatus 2, a state of the power receiving apparatus 41, a state of charge (SOC) of the battery 42, temperature and allowable charging power of the battery 42, information indicating the presence or absence of the elevating mechanism, a height of the power receiving unit 411 from the ground, information about a position of the vehicle 4, and the like. Incidentally, the state of charge of the battery 42 or the like may be obtained from the output of the vehicle-side sensor 44 by the ECU 43.

The processor 31 of the server 3 transmits the vehicle information associated with the vehicle identification information about the vehicle 4 to the ground power supply apparatus 2. At this time, the processor 31 stores the vehicle information associated with the vehicle identification information about the vehicle 4, for example, in a database constructed in the storage apparatus 32. The server 3 obtains the vehicle information associated with the vehicle identification information about each vehicle from respective one of a plurality of vehicles including the vehicle 4.

The controller 23 of the ground power supply apparatus 2 that has received, via the wide area wireless communication, the vehicle information associated with the vehicle identification information about the vehicle 4 registers the vehicle identification information about the vehicle 4 in an identification information list. This allows the ground power supply apparatus 2 to communicate with the vehicle 4 via the narrow area wireless communication. In other words, this allows the narrow area communication apparatus 26 of the ground power supply apparatus 2 to receive the vehicle identification information from the narrow area communication apparatus 46 of the vehicle 4.

At this time, the controller 23 controls the wide area communication apparatus 25 so as to transmit a notice indicating that the vehicle identification information about the vehicle 4 is registered in the identification information list, to the vehicle 4 via the wide area wireless communication.

The ECU 43 of the vehicle 4 that has received, via the wide area wireless communication, the notice indicating that the vehicle identification information about the vehicle 4 is registered in the identification information list controls the narrow area communication apparatus 46 so as to transmit a signal including the vehicle identification information to the ground power supply apparatus 2 when the vehicle 4 approaches the ground power supply apparatus 2. The ECU 43 further controls the power receiving apparatus 41 so as to receive an electric power from the ground power supply apparatus 2 when the vehicle 4 arrives at the ground power supply apparatus 2. A state in which the narrow area communication apparatus 46 is capable of transmitting the signal including the vehicle identification information, and in which the power receiving apparatus 41 is capable of receiving an electric power is referred to as a "power reception active/signal transmission state" as appropriate.

When the vehicle 4 in the power reception active/signal transmission state approaches the ground power supply apparatus 2, the narrow area communication apparatus 26 of the ground power supply apparatus 2 receives the signal including the vehicle identification information, which is transmitted from the narrow area communication apparatus 46 of the vehicle 4.

When the narrow area communication apparatus 26 receives the vehicle identification information, the controller 23 of the ground power supply apparatus 2 verifies the received vehicle identification information with the vehicle identification information registered in the identification information list. When the received vehicle identification information is registered in the identification information list, the controller 23 controls the power transmitting apparatus 21 so as to transmit an electric power to the vehicle 4 when the vehicle 4 is on the ground power supply apparatus 2. A state in which the power transmitting apparatus 21 is capable of transmitting an electric power is referred to as a "power transmission active state" as appropriate.

When the power receiving unit 411 of the vehicle 4 in the power reception active/signal transmission state is positioned on the power transmitting unit 211 of the ground power supply apparatus 2 in the power transmission active state, electric power supply is performed from the ground power supply apparatus 2 to the vehicle 4. Thereafter, the electric power supply is ended when a predetermined end condition is satisfied. The predetermined end condition may include, for example, that an electric power corresponding to the vehicle required power is transmitted, that the vehicle 4 is a predetermined distance or more away from the ground power supply apparatus 2, that the battery 43 of the vehicle 4 becomes fully charged, and the like.

In the wireless power supply system 1, an electric power is transmitted in a wireless manner without using wiring. Therefore, when the power transmitting unit 211 and the power receiving unit 411 get closer (i.e., when a distance between the power transmitting unit 211 and the power receiving unit 411 is shortened), a transmission efficiency of the electric power is increased.

On the other hand, in order to shorten the distance between the power transmitting unit 211 and the power receiving unit 411, for example, if the power transmitting unit 211 is installed to protrude from the ground, or if the power receiving unit 411 is disposed near the ground, then, the power transmitting unit 211 and the power receiving unit 411 are easily damaged.

The ground power supply apparatus 2 includes the elevating mechanism 213 that is configured to move the power transmission section 211 in the direction perpendicular to the ground. The vehicle 4 includes the elevating mechanism 413 that is configured to move the power receiving unit 411 in the direction perpendicular to the ground. With this configuration, it is possible to bring the power transmitting unit 211 and the power receiving unit 411 closer during the power transmission, and it is also possible to prevent the damage of the power transmitting unit 211 and the power receiving unit 411.

However, if the ground power supply apparatus 2 and the vehicle 4 independently control the elevating mechanisms 213 and 413, for example, the power transmission may not be performed properly. Therefore, in the wireless power supply system 1, the server 3 determines control aspects of the elevating mechanism 213 and 413. That is, in the embodiment, the server 3 corresponds to an example of the elevating operation apparatus.

Figure 4:
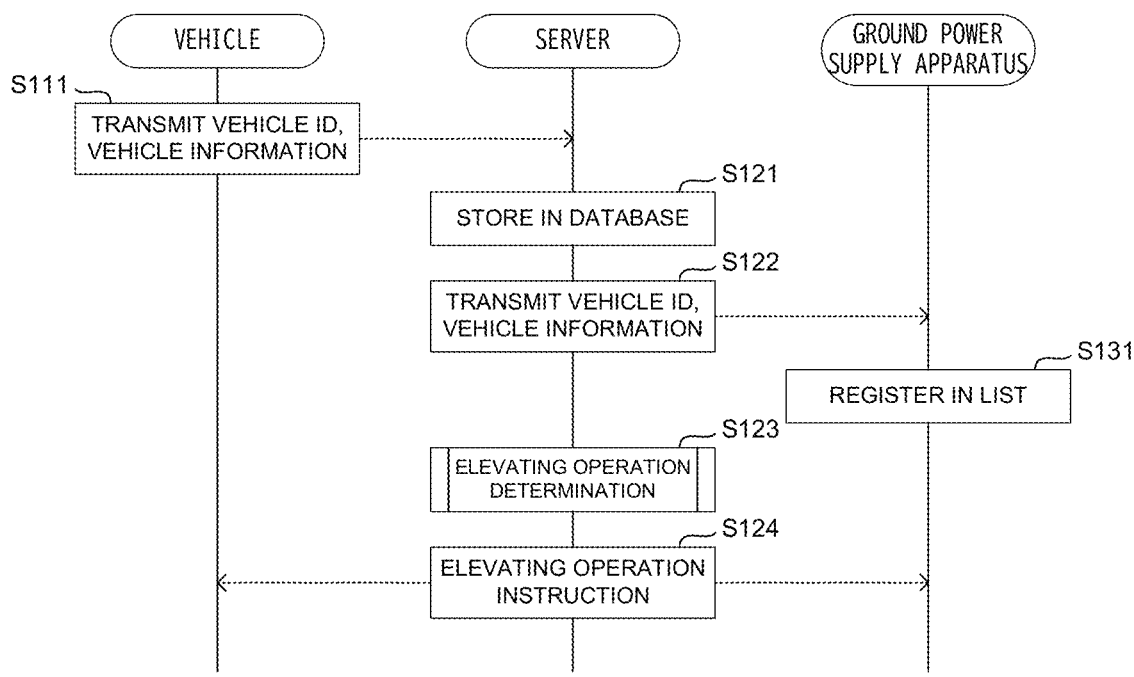
FIG. 4 is a flowchart illustrating an example of operation of the wireless power supply system.

The operation of the wireless power supply system 1 will be described with reference to a flowchart in FIG. 4. In FIG. 4, the ECU 43 of the vehicle 4 controls the wide area communication apparatus 45 so as to transmit the vehicle information associated with the vehicle identification information to the server 3 (step S111). The vehicle information includes information about the elevating mechanism 413. The information about the elevating mechanism 413 may include, for example, information indicating a movable range of the elevating mechanism 413 and information indicating the presence or absence of abnormality.

The processor 31 of the server 3 stores the vehicle information associated with the vehicle identification information about the vehicle 4, for example, in the database constructed in the storage apparatus 32 (step S121). Here, apparatus information associated with apparatus identification information about the ground power supply apparatus 2 is also stored in the database. The processor 31 may generate a use reservation list for the ground power supply apparatus 2, for example, by associating the vehicle identification information about the vehicle (e.g., the vehicle 4) that uses the ground power supply apparatus 2 with the apparatus identification information about the ground power supply apparatus 2.

The apparatus information includes information about the elevating mechanisms 213. The information about the elevating mechanism 213 may include, for example, information indicating a movable range of the elevating mechanism 213 and information indicating the presence or absence of abnormality. The apparatus information may include, for example, the position and state of the ground power supply apparatus 2 (e.g., during transmission, standby, etc.).

When the vehicle does not include the elevating mechanism, the vehicle information about the vehicle may not include the information about the elevating mechanism, or may include information indicating that there is no elevating mechanism. Similarly, when the ground power supply apparatus does not include the elevating mechanism, the apparatus information about the ground power supply apparatus may not include the information about the elevating mechanism, or may include information indicating that there is no elevating mechanism.

In parallel with or before and after the step S121, the processor 31 of the server 3 controls the external communication module 33 so as to transmit the vehicle information associated with the vehicle identification information about the vehicle 4 to the ground power supply apparatus 2 (step S122).

The controller 23 of the ground power supply apparatus 2 registers the vehicle identification information about the vehicle 4 received from the server 3, in the identification information list (step S131). At this time, the controller 23 controls the wide area communication apparatus 25 so as to transmit the notice indicating that the vehicle identification information about the vehicle 4 is registered in the identification information list, to the server 3. As a result, the notice indicating that the vehicle identification information about the vehicle 4 is registered in the identification information list is transmitted to the vehicle 4 via the server 3.

The processor 31 of the server 3 that has obtained the vehicle information about the vehicle 4 in the step S121 performs a elevating operation determination process (step S123). Hereinafter, the elevating operation determination process will be described with reference to a specific example.

In the elevating operation determination process, the processor 31 of the server 3 firstly determines whether or not the vehicle 4 includes the elevating mechanism, and whether or not the ground power supply apparatus 2 includes the elevating mechanism, on the basis of the vehicle information about the vehicle 4 and the apparatus information about the ground power supply apparatus 2 stored in the database. Here, it is determined that the vehicle 4 includes the elevating mechanism 413, and that the ground power supply apparatus 2 includes the elevating mechanism 213.

Next, the processor 31 determines an operation mode of the elevating mechanism, for example, on the basis of a determination table 1 stored in the storage apparatus 32 (see FIG. 5A) and the determination result. For example, when the vehicle includes the elevating mechanism while the ground power supply apparatus does not include the elevating mechanism, the processor 31 determines to activate the elevating mechanism of the vehicle in accordance with the determination table 1. For example, when the ground power supply apparatus includes the elevating mechanism while the vehicle does not include the elevating mechanism, the processor 31 determines to activate the ground power supply apparatus in accordance with the determination table 1.

When both the vehicle and the ground power supply apparatus include the respective elevating mechanisms, the processor 31 further determines the operating aspect of the elevating mechanism, for example, on the basis of a determination table 2 stored in the storage apparatus 32 (see FIG. 5B).

Here, since the vehicle 4 includes the elevating mechanism 413 and the ground power supply apparatus 2 includes the elevating mechanism 213, the processor 31 determines the operation mode of the elevating mechanism on the basis of the determination table 2.

(1) For example, when the processor 31 has generated the use reservation list for the ground power supply apparatus 2 and the use reservation list indicates that another vehicle will use the ground power supply apparatus 2 after the vehicle 4, the processor 31 determines to activate the elevating mechanisms 413 of the vehicle 4.

It takes a certain amount of time for the elevating mechanism 213 to move the power transmitting unit 211 to a position suitable for a target vehicle (e.g., the vehicle 4) of the electric power transmission. When a plurality of vehicles use the ground power supply apparatus 2 in a relatively short period, it is better to move the power receiving unit of the vehicle (e.g., the power receiving unit 411 of the vehicle 4) so as to shorten a time required for the electric power transmission. Therefore, in the above-described case, the processor 31 determines to activate the elevating mechanism 413 of the vehicle 4.

(2) When, however, the use reservation list indicates that the type of another vehicle that uses the ground power supply apparatus 2 after the vehicle 4 is the same as or similar to the type of the vehicle 4, the processor 31 determines to activate the elevating mechanisms 213 of the ground power supply apparatus 2.

For example, it takes a certain amount of time for the elevating mechanism 413 to move the power receiving unit 411 of the vehicle 4 to a position suitable for electric power reception. When a plurality of vehicles of the same type or similar type continuously use the ground power supply apparatus 2, if the power receiving unit 211 is moved by the elevating mechanism 213 at a position suitable for the first vehicle, then, it is not necessary to move the power receiving unit 211 thereafter. Therefore, in the above-described case, it is better to activate the elevating mechanism 213 of the ground power supply apparatus 2 so as to shorten the time required for the electric power transmission. Thus, in the above-described case, the processor 31 determines to activate the elevating mechanisms 213 of the ground power supply apparatus 2.

When the type of the vehicle is classified by a body type such as, for example, sedan, minivan, and SUV (Sport Utility Vehicle), "the same type" may mean that the same body type. Alternatively, when the type of the vehicle is classified by a proper name (e.g., a product name) of the vehicle, "the same type" may mean the same proper name of the vehicle. For example, the similarity of types may be determined on the basis of a range of a ground height for each type, and it may be determined that the types having a relatively high similarity are similar to each other.

(3) When the vehicle information about the vehicle 4 includes information indicating that there is an abnormality in the elevating mechanism 413 while the apparatus information about the ground power supply apparatus 2 includes information indicating that there is no abnormality in the elevating mechanism 213, the processor 31 determines to activate the elevating mechanism 213 of the ground power supply apparatus 2.

(4) When the apparatus information about the ground power supply apparatus 2 includes information indicating that there is an abnormality in the elevating mechanism 213 while the vehicle information about the vehicle 4 includes information indicating that there is no abnormality in the elevating mechanism 413, the processor 31 determines to activate the elevating mechanism 413 of the vehicle 4.

(5) When the vehicle information about the vehicle 4 includes information indicating that the state of charge of the battery 42 is a low SOC, the processor 31 determines to activate the elevating mechanisms 213 of the ground power supply apparatus 2. With this configuration, the electric power of the battery 42 is not consumed to activate the elevating mechanism 413 of the vehicle 4, which is practically advantageous.

(6) When a road surface is rough around the ground power supply apparatus 2, the processor 31 determines to activate the elevating mechanisms 213 of the ground power supply apparatus 2. For example, when the vehicle information about the vehicle 4 includes a history of vertical acceleration of the vehicle 4, the processor 31 may determine whether or not the road surface is rough, from the extent of variation of the vertical acceleration of the vehicle 4.

For example, when the power receiving unit 411 of the vehicle 4 is moved by the elevating mechanism 413, the movement of the power receiving unit 411 is started before the vehicle 4 arrives at the ground power supply apparatus 2 such that the electric power transmission is started from the ground power supply apparatus 2 to the vehicle 4 as soon as the vehicle 4 arrives at the ground power supply apparatus 2. At this time, if the road surface is rough around the ground power supply apparatus 2, the vehicle 4 may vibrate relatively significantly in a vertical direction due to the road surface, and this may damage the power receiving unit 411.

Therefore, in the above-described case, it is possible to prevent the damage of the power receiving unit 411 if the elevating mechanism 213 is activated so as to move the power transmitting unit 211 without moving the power receiving unit 411. Thus, in the above-described case, the processor 31 determines to activate the elevating mechanisms 213 of the ground power supply apparatus 2.

(7) When a rainfall or a snowfall is detected, the processor 31 determines to activate the elevating mechanism 413 of the vehicle 4. With this configuration, it is possible to prevent rainwater or the like from flowing into a space generated by the movement of the power transmitting unit 211 (i.e., an accommodation space of the power transmitting unit 211), which is practically advantageous. When the vehicle information about the vehicle 4 and the apparatus information about the ground power supply apparatus 2 include precipitation information indicating the output of the rainfall sensor, the processor 31 may detect a rainfall or a snowfall on the basis of the precipitation information. The processor 31 may obtain the precipitation information from another apparatus (e.g., an apparatus that provides a weather information service) via the communication network 5, and may detect a rainfall or a snowfall on the basis of the obtained precipitation information.

(8) When the vehicle information about the vehicle 4 includes information indicating a ground height of the vehicle 4 and the ground height of the vehicle 4 is greater than a predetermined value, the processor 31 determines to activate both the elevating mechanism 413 of the vehicle 4 and the elevating mechanism 213 of the ground power supply apparatus 2.

The "predetermined value" is a value for determining whether or not to activate both the elevating mechanism of the vehicle (e.g., the elevating mechanism 413) and the elevating mechanism of the ground power supply apparatus (e.g., the elevating mechanism 213), and is set in advance as a fixed value or as a variable value corresponding to some physical quantity or parameter.

When one of the power transmitting unit 211 and the power receiving unit 411 is moved by respective one of the elevating mechanism 213 and the elevating mechanism 413, for example, on the basis of the movable range of the elevating mechanism 213 of the ground power supply apparatus 2, the movable range of the elevating mechanism 413 of the vehicle 4, and a desired value of the distance between the power transmitting unit 211 and the power receiving unit 411 upon the electric power transmission, the "predetermined value" may be set as a maximum value of the ground height that allows the above desired value to be achieved.

(9) When the vehicle information about the vehicle 4 includes a current position and velocity of the vehicle 4 and when a time required until the vehicle 4 arrives the ground power supply apparatus 2 is less than a predetermined time, the processor 31 determines to activate both the elevating mechanism 413 of the vehicle 4 and the elevating mechanism 213 of the ground power supply apparatus 2.

As described above, it takes a certain amount of time for the elevating mechanism 213 to move the power transmitting unit 211 to a position suitable for a target vehicle (e.g., the vehicle 4) of the electric power transmission. Similarly, it takes a certain amount of time, for example, for the elevating mechanism 413 to move the power receiving unit 411 of the vehicle 4 to a position suitable for the electric power reception.

If the vehicle 4 arrives at the ground power supply apparatus 2 before the movement of one of the power transmitting unit 211 and the power receiving unit 411 is completed by respective one of the elevating mechanism 213 and the elevating mechanism 413, there is a possibility that the electric power transmission is not appropriately performed from the ground power supply apparatus 2 to the vehicle 4. It is particularly problematic when the electric power transmission is performed from the ground power supply apparatus 2 to the vehicle 4 while the vehicle 4 is running.

Therefore, in the above-described case, if both the power transmitting unit 211 and the power receiving unit 411 are moved, it is possible to make the distance between the power transmitting unit 211 and the power receiving unit 411 closer relatively quickly. Thus, in the above-described case, the processor 31 determines to activate both the elevating mechanism 413 of the vehicle 4 and the elevating mechanism 213 of the ground power supply apparatus 2.

The "predetermined time" is a value for determining whether or not to activate both the elevating mechanism of the vehicle (e.g., the elevating mechanism 413) and the elevating mechanism of the ground power supply apparatus (e.g., the elevating mechanism 213), and is set in advance as a fixed value or as a variable value corresponding to some physical quantity or parameter.

When one of the power transmitting unit 211 and the power receiving unit 411 is moved by respective one of the elevating mechanism 213 and the elevating mechanism 413, for example, on the basis of a moving velocity of the power transmitting unit 211 by the elevating mechanism 213 of the ground power supply apparatus 2, a moving velocity of the power receiving unit 411 by the elevating mechanism 413 of the vehicle 4, and a desired value of the distance between the power transmitting unit 211 and the power receiving unit 411 upon the electric power transmission, the "predetermined time" may be set as a time required to achieve the above desired value.

After the step S123, the processor 31 transmits an operation instruction related to the elevating mechanism to at least one of the ground power supply apparatus 2 and the vehicle 4 on the basis of a result of the elevating operation determination process (step S124). The operation instruction includes information indicating an operation amount of at least one of the power transmitting unit 211 and the power receiving unit 411. The operation amount may be determined, for example, on the basis of the ground height of the vehicle 4 and the desired value of the distance between the power transmitting unit 211 and the power receiving unit 411 upon the electric power transmission.

At this time, when the ground power supply apparatus 2 does not activate the elevating mechanism 213, the processor 31 may not transmit the result of the elevating operation determination process to the ground power supply apparatus 2, or may transmit, for example, an instruction indicating that the elevating mechanism 213 is not activated, an instruction indicating that the operation amount of the power transmitting unit 211 is zero, or similar instructions to the ground power supply apparatus 2. Similarly, when the vehicle 4 does not activate the elevating mechanism 413, the processor 31 may not transmit the result of the elevating operation determination process to the vehicle 4, or may transmit, for example, an instruction indicating that the elevating mechanism 413 is not activated, an instruction indicating that the operation amount of the power receiving unit 411 is zero, or similar instructions to the vehicle 4.

Next, the operation of the vehicle 4 and the ground power supply apparatus 2 that have received the operation instruction related to the elevating mechanism by the operation illustrated in FIG. 4 will be described with reference to a flowchart in FIG. 6.

Figure 6:
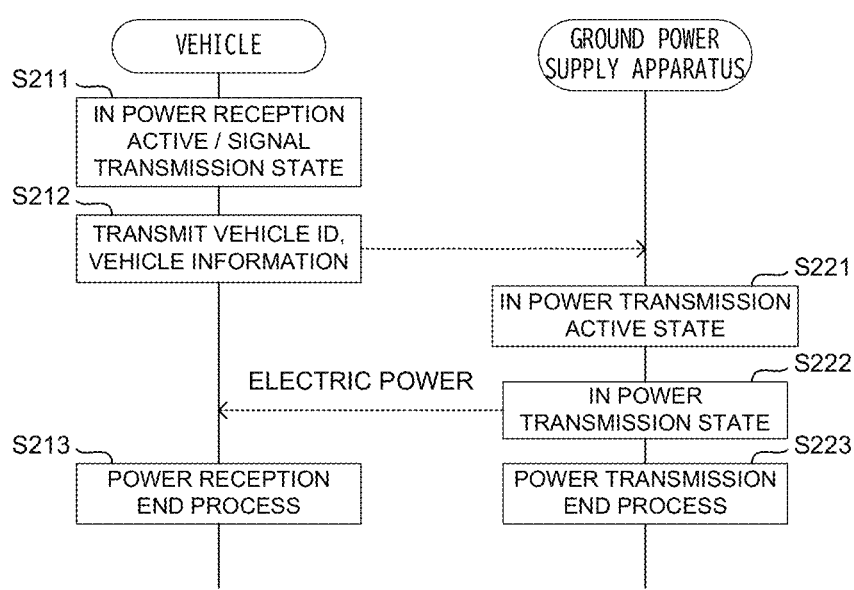
FIG. 6 is a flowchart illustrating another example of the operation of the wireless power supply system.

In FIG. 6, the ECU 43 of the vehicle 4 that has received the notice indicating that the vehicle identification information about the vehicle 4 is registered in the identification information list from the ground power supply apparatus 2 via the wide area wireless communication, becomes in the power reception active/signal transmission state (step S211). Consequently, the ECU 43 controls the narrow area communication apparatus 46 so as to transmit the signal including the vehicle identification information about the vehicle 4 (step S212).

At this time, the ECU 43 of the vehicle 4 controls the elevating mechanism 413 on the basis of the operation instruction related to the elevating mechanism 413 from the processor 31 of the server 3. Specifically, when the elevating mechanism 413 is activated by the operation instruction related to the elevating mechanism 413, the ECU 43 controls the elevating mechanism 413 so as to move the power receiving unit 411 by an amount corresponding to the operation amount of the power receiving unit 411 included in the operation instruction. On the other hand, when the elevating mechanism 413 is not activated by the operation instruction related to the elevating mechanism 413, the ECU 43 controls the elevating mechanism 413 so as not to move the power receiving unit 411.

Then, when the narrow area communication apparatus 26 of the ground power supply apparatus 2 receives the signal including the vehicle identification information transmitted from the narrow area communication apparatus 46 of the vehicle 4, the ground power supply apparatus 2 becomes in the power transmission active state (step S221). At this time, the controller 23 of the ground power supply apparatus 2 controls the elevating mechanism 213 on the basis of the operation instruction related to the elevating mechanism 213 from the processor 31 of the server 3.

Specifically, when the elevating mechanism 213 is activated by the operation instruction related to the elevating mechanism 213, the controller 23 controls the elevating mechanism 213 so as to move the power transmitting unit 211 by an amount corresponding to the operation amount of the power transmitting unit 211 included in the operation instruction. On the other hand, when the elevating mechanism 213 is not activated by the operation instruction related to the elevating mechanism 213, the controller 23 controls the elevating mechanism 213 so as not to move the power transmitting unit 211.

Then, when the power receiving unit 411 of the vehicle 4 in the power reception active/signal transmission state is located on the power transmitting unit 211 of the ground power supply apparatus 2 in the electric power transmission active state, the electric power transmission is performed from the ground power supply apparatus 2 to the vehicle 4 (step S222). A state of the ground power supply apparatus 2 at this time is referred to as a "power transmission state."

Then, the electric power supply is ended when the predetermined end condition is satisfied. At this time, the ECU 43 of the vehicle 4 performs a predetermined power reception end process (step S213). In addition, the ground power supply apparatus 2 performs a predetermined power transmission end process (step S223).

The power reception end process may include, for example, controlling the relay 47 so as to shut off the electrical connection between the power receiving apparatus 41 and the battery 42, and controlling the elevating mechanism 413 so as to accommodate the power receiving unit 411 in a predetermined position. The power transmission end process may include, for example, controlling the elevating mechanisms 213 so as to accommodate the power transmitting unit 211 in a predetermined position.

(Technical Effect)

In the wireless power supply system 1, the elevating operation determination process (see step S123 in FIG. 4) is performed by the server 3, and it is determined, for example, how to activate the elevating mechanism 213 of the ground power supply apparatus 2 and the elevating mechanism 413 of the vehicle 4. Therefore, according to the wireless power supply system 1, it is possible to appropriately perform the operation of the elevating mechanism.

<Modified Example>

The elevating operation determination process in the step S123 may be performed, for example, by the controller 23 of the ground power supply apparatus 2 or the ECU 43 of the vehicle 4, in place of the processor 31 of the server 3. In this case, the processor 31 of the server 3 may transmit the vehicle information about the vehicle 4 including the information about the elevating mechanism 413, to the ground power supply apparatus 2, or may transmit the apparatus information about the ground power supply apparatus 2 including the information about the elevating mechanism 213, to the vehicle 4.

Various aspects of embodiments of the present disclosure derived from the embodiment and modified example described above will be described below.

An elevating operation apparatus according to an aspect of embodiments of the present disclosure includes: an obtaining device configured to obtain a first information and a second information, wherein the first information indicates whether or not one vehicle, which has a power receiving unit for wireless electric power supply, includes an elevating mechanism for moving the power receiving unit in a height direction of the one vehicle, and the second information indicates whether or not a power supply apparatus, which is installed outside the one vehicle and which has a power transmitting unit for wireless electric power supply, includes a elevating mechanism for moving the power transmitting unit in the height direction; and a determining device configured to determine to move at least one of the power receiving unit and the power transmitting unit in the height direction on the basis of the first information and the second information.

In the above-described embodiment, the "server 3" corresponds to an example of the "elevating operation apparatus", the "processor 31" corresponds to an example of the "determining device", and the "external communication module 33" corresponds to an example of the "obtaining device". In the above-described embodiment, the "vehicle information about the vehicle 4" corresponds to an example of the "first information", and the "apparatus information about the ground power supply apparatus 2" corresponds to an example of the "second information".

In the elevating operation apparatus, the obtaining device may obtain vehicle information about each of a plurality of vehicles including the one vehicle, and the determining device may determine to move the power receiving unit in the height direction when the first information indicates that the one vehicle includes the elevating mechanism of the power receiving unit, and when there is another vehicle that performs the wireless electric power supply by using the power supply apparatus following the one vehicle.

In the elevating operation apparatus, the obtaining device may obtain vehicle information about each of a plurality of vehicles including the one vehicle, and the determining device may determine to move the power transmitting unit in the height direction when the second information indicates that the power supply apparatus includes the elevating mechanism of the power transmitting unit, and when a type of another vehicle that performs the wireless electric power supply by using the power supply apparatus following the one vehicle is the same as or similar to a type of the one vehicle.

In the elevating operation apparatus, the first information may include first state information indicating a state of the elevating mechanism of the power receiving unit when the first information indicates that the one vehicle includes the elevating mechanism of the power receiving unit, the second information may include second state information indicating a state of the elevating mechanism of the power transmitting unit when the second information indicates that the power supply apparatus includes the elevating mechanism of the power transmitting unit, and the determining device may determine to move at least one of the power receiving unit and the power transmitting unit in the height direction on the basis of the first state information and the second state information.

In the elevating operation apparatus, the determining device may determine to move the power transmitting unit in the height direction when the second information indicates that the power supply apparatus includes the elevating mechanism of the power transmitting unit, and when a battery charge remaining of the one vehicle is less than a predetermined value.

In the elevating operation apparatus, the obtaining device may obtain precipitation information about precipitation around the power supply apparatus, and the determining device may determine to move the power receiving unit in the height direction when the first information indicates that the one vehicle includes the elevating mechanism of the power receiving unit, and when the precipitation is detected around the power supply apparatus on the basis of the precipitation information.

In the elevating operation apparatus, the obtaining device may obtain road surface information about a road surface state around the power supply apparatus, and the determining device may determine to move the power transmitting unit in the height direction when the second information indicates that the power supply apparatus includes the elevating mechanism of the power transmitting unit, and when the road surface indicates that the road surface is rough around the power supply apparatus. In the above-described embodiment, the "history of vertical acceleration of the vehicle 4" corresponds to an example of the "road surface information".

An operation method according to an aspect of embodiments the present disclosure is an operation method in an elevating operation apparatus, including: an obtaining step in which the elevating operation apparatus obtains a first information and a second information, wherein the first information indicates whether or not one vehicle, which has a power receiving unit for wireless electric power supply, includes a elevating mechanism for moving the power receiving unit in a height direction of the one vehicle, and the second information indicates whether or not a power supply apparatus, which is installed outside the one vehicle and which includes a power transmitting unit for wireless electric power supply, includes a elevating mechanism for moving the power transmitting unit in the height direction; and a determining step in which the elevating operation apparatus determines to move at least one of the power receiving unit and the power transmitting unit in the height direction on the basis of the first information and the second information.

Embodiments of the present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An elevating operation apparatus comprising:
an obtainer configured to obtain a first information and a second information, wherein the first information indicates whether or not one vehicle, which has a power receiving unit for wireless electric power supply, includes an elevating mechanism for moving the power receiving unit in a height direction of the one vehicle, and the second information indicates whether or not a power supply apparatus, which is installed outside the one vehicle and which has a power transmitting unit for wireless electric power supply, includes an elevating mechanism for moving the power transmitting unit in the height direction; and
a determinator configured to determine to move at least one of the power receiving unit and the power transmitting unit in the height direction on the basis of the first information and the second information.

2. The elevating operation apparatus according to claim 1, wherein
the obtainer obtains vehicle information about each of a plurality of vehicles including the one vehicle, and
the determinator determines to move the power receiving unit in the height direction when the first information indicates that the one vehicle includes the elevating mechanism of the power receiving unit, and when there is another vehicle that performs the wireless electric power supply by using the power supply apparatus following the one vehicle.

3. The elevating operation apparatus according to claim 1, wherein
the obtainer obtains vehicle information about each of a plurality of vehicles including the one vehicle, and
the determinator determines to move the power transmitting unit in the height direction when the second information indicates that the power supply apparatus includes the elevating mechanism of the power transmitting unit, and when a type of another vehicle, that performs the wireless electric power supply by using the power supply apparatus following the one vehicle, is the same as or similar to a type of the one vehicle.

4. The elevating operation apparatus according to claim 1, wherein
the first information includes first state information indicating a state of the elevating mechanism of the power receiving unit when the first information indicates that the one vehicle includes the elevating mechanism of the power receiving unit,
the second information includes second state information indicating a state of the elevating mechanism of the power transmitting unit when the second information indicates that the power supply apparatus includes the elevating mechanism of the power transmitting unit, and the determinator determines to move at least one of the power receiving unit and the power transmitting unit in the height direction on the basis of the first state information and the second state information.

5. The elevating operation apparatus according to claim 1, wherein the determinator determines to move the power transmitting unit in the height direction when the second information indicates that the power supply apparatus includes the elevating mechanism of the power transmitting unit, and when battery charge remaining of the one vehicle is less than a predetermined value.

6. The elevating operation apparatus according to claim 1, wherein
the obtainer obtains precipitation information about precipitation around the power supply apparatus, and
the determinator determines to move the power receiving unit in the height direction when the first information indicates that the one vehicle includes the elevating mechanism of the power receiving unit, and when precipitation is detected around the power supply apparatus on the basis of the precipitation information.

7. The elevating operation apparatus according to claim 1, wherein
the obtainer obtains road surface information about a road surface state around the power supply apparatus, and
the determinator determines to move the power transmitting unit in the height direction when the second information indicates that the power supply apparatus includes the elevating mechanism of the power transmitting unit, and when the road surface information indicates that the road surface around the power supply apparatus is rough.

8. An operation method in an elevating operation apparatus, comprising:
an acquiring step in which the elevating operation apparatus obtains a first information and a second information, wherein the first information indicates whether or not one vehicle, which has a power receiving unit for wireless electric power supply, includes an elevating mechanism for moving the power receiving unit in a height direction of the one vehicle, and the second information indicates whether or not a power supply apparatus, which is installed outside the one vehicle and which has a power transmitting unit for wireless electric power supply, includes an elevating mechanism for moving the power transmitting unit in the height direction; and
a determining step in which the elevating operation apparatus determines to move at least one of the power receiving unit and the power transmitting unit in the height direction on the basis of the first information and the second information.

9. The elevating operation apparatus according to claim 2, wherein
the obtainer obtains vehicle information about each of a plurality of vehicles including the one vehicle, and
the determinator determines to move the power transmitting unit in the height direction when the second information indicates that the power supply apparatus includes the elevating mechanism of the power transmitting unit, and when a type of another vehicle, that performs the wireless electric power supply by using the power supply apparatus following the one vehicle, is the same as or similar to a type of the one vehicle.

10. The elevating operation apparatus according to claim 2, wherein the first information includes first state information indicating a state of the elevating mechanism of the power receiving unit when the first information indicates that the one vehicle includes the elevating mechanism of the power receiving unit, the second information includes second state information indicating a state of the elevating mechanism of the power transmitting unit when the second information indicates that the power supply apparatus includes the elevating mechanism of the power transmitting unit, and the determinator determines to move at least one of the power receiving unit and the power transmitting unit in the height direction on the basis of the first state information and the second state information.

11. The elevating operation apparatus according to claim 3, wherein the first information includes first state information indicating a state of the elevating mechanism of the power receiving unit when the first information indicates that the one vehicle includes the elevating mechanism of the power receiving unit, the second information includes second state information indicating a state of the elevating mechanism of the power transmitting unit when the second information indicates that the power supply apparatus includes the elevating mechanism of the power transmitting unit, and the determinator determines to move at least one of the power receiving unit and the power transmitting unit in the height direction on the basis of the first state information and the second state information.

12. The elevating operation apparatus according to claim 2, wherein the determinator determines to move the power transmitting unit in the height direction when the second information indicates that the power supply apparatus includes the elevating mechanism of the power transmitting unit, and when battery charge remaining of the one vehicle is less than a predetermined value.

13. The elevating operation apparatus according to claim 3, wherein the determinator determines to move the power transmitting unit in the height direction when the second information indicates that the power supply apparatus includes the elevating mechanism of the power transmitting unit, and when battery charge remaining of the one vehicle is less than a predetermined value.

14. The elevating operation apparatus according to claim 4, wherein the determinator determines to move the power transmitting unit in the height direction when the second information indicates that the power supply apparatus includes the elevating mechanism of the power transmitting unit, and when battery charge remaining of the one vehicle is less than a predetermined value.

15. The elevating operation apparatus according to claim 2, wherein the obtainer obtains precipitation information about precipitation around the power supply apparatus, and the determinator determines to move the power receiving unit in the height direction when the first information indicates that the one vehicle includes the elevating mechanism of the power receiving unit, and when precipitation is detected around the power supply apparatus on the basis of the precipitation information.

16. The elevating operation apparatus according to claim 3, wherein the obtainer obtains precipitation information about precipitation around the power supply apparatus, and the determinator determines to move the power receiving unit in the height direction when the first information indicates that the one vehicle includes the elevating mechanism of the power receiving unit, and when precipitation is detected around the power supply apparatus on the basis of the precipitation information.

17. The elevating operation apparatus according to claim 4, wherein the obtainer obtains precipitation information about precipitation around the power supply apparatus, and the determinator determines to move the power receiving unit in the height direction when the first information indicates that the one vehicle includes the elevating mechanism of the power receiving unit, and when precipitation is detected around the power supply apparatus on the basis of the precipitation information.

18. The elevating operation apparatus according to claim 5, wherein the obtainer obtains precipitation information about precipitation around the power supply apparatus, and the determinator determines to move the power receiving unit in the height direction when the first information indicates that the one vehicle includes the elevating mechanism of the power receiving unit, and when precipitation is detected around the power supply apparatus on the basis of the precipitation information.

19. The elevating operation apparatus according to claim 2, wherein the obtainer obtains road surface information about a road surface state around the power supply apparatus, and the determinator determines to move the power transmitting unit in the height direction when the second information indicates that the power supply apparatus includes the elevating mechanism of the power transmitting unit, and when the road surface information indicates that the road surface around the power supply apparatus is rough.

20. The elevating operation apparatus according to claim 3, wherein the obtainer obtains road surface information about a road surface state around the power supply apparatus, and the determinator determines to move the power transmitting unit in the height direction when the second information indicates that the power supply apparatus includes the elevating mechanism of the power transmitting unit, and when the road surface information indicates that the road surface around the power supply apparatus is rough.

\* \* \* \* \*